United States Patent
Baker et al.

(12) 
(10) Patent No.: US 6,910,740 B2
(45) Date of Patent: Jun. 28, 2005

(54) ARTICULATED HEADRESTRAINT SYSTEM

(75) Inventors: Christopher Baker, Amherst, OH (US); Ajay Bhandari, Westlake, OH (US)

(73) Assignee: Camaco, Novi, MI (US)

( * ) Notice: Subject to any disclaimer, the term of this patent is extended or adjusted under 35 U.S.C. 154(b) by 0 days.

(21) Appl. No.: 10/313,809

(22) Filed: Dec. 9, 2002

(65) Prior Publication Data
US 2004/0108766 A1 Jun. 10, 2004

(51) Int. Cl.[7] ................................... A47C 1/10

(52) U.S. Cl. .................. 297/408; 297/410; 297/391; 297/404

(58) Field of Search .................. 297/408, 410, 297/403, 391, 404; 292/DIG. 37

(56) References Cited

U.S. PATENT DOCUMENTS

| | | | | |
|---|---|---|---|---|
| 4,711,494 A | * | 12/1987 | Duvenkamp | 297/403 |
| 4,830,434 A | | 5/1989 | Ishida et al. | 297/408 |
| 5,003,240 A | * | 3/1991 | Ikeda | 318/603 |
| 5,006,771 A | * | 4/1991 | Ogasawara | 318/568.1 |
| 5,590,933 A | * | 1/1997 | Andersson | 297/408 |
| 5,669,668 A | * | 9/1997 | Leuchtmann | 297/408 |
| 5,992,937 A | * | 11/1999 | Pilhall | 297/408 |
| 6,045,181 A | * | 4/2000 | Ikeda et al. | 297/216.12 |
| 6,129,421 A | * | 10/2000 | Gilson et al. | 297/408 |
| 6,511,130 B2 | * | 1/2003 | Dinkel et al. | 297/410 |

* cited by examiner

Primary Examiner—Peter M. Cuomo
Assistant Examiner—Erika Garrett
(74) Attorney, Agent, or Firm—Charles W. Chandler

(57) ABSTRACT

An articulated headrestraint system for a vehicle seat permits the user to adjust the headrest vertically, and to adjust the headrest either forwardly by using a pushbuttom mechanism, or rearwardly with respect to the top of the seat.

11 Claims, 6 Drawing Sheets

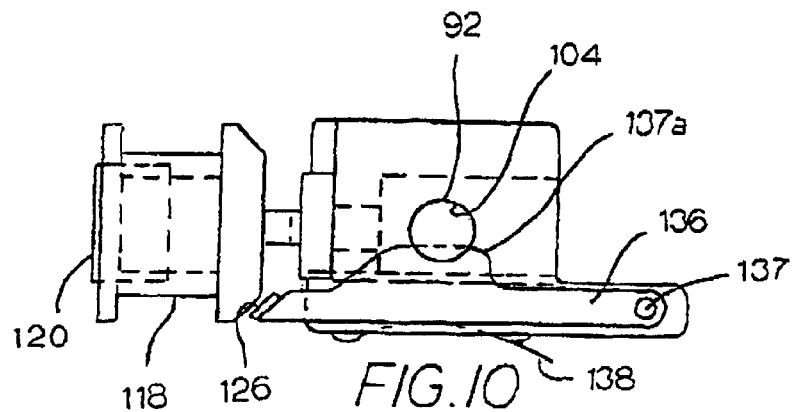
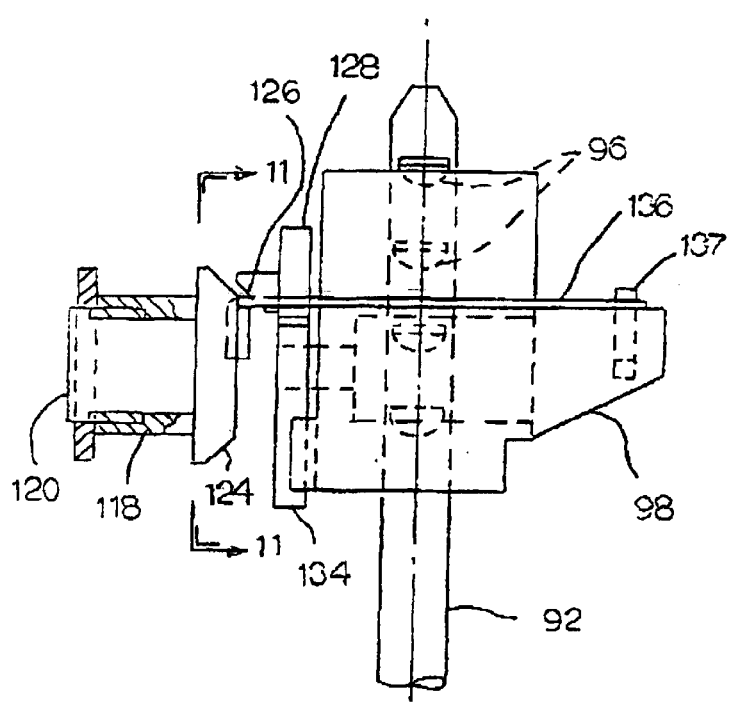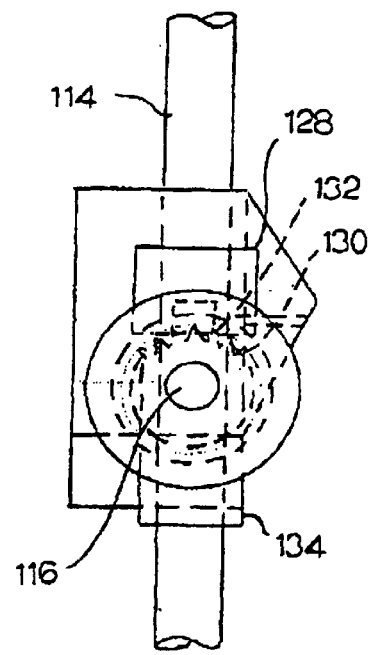

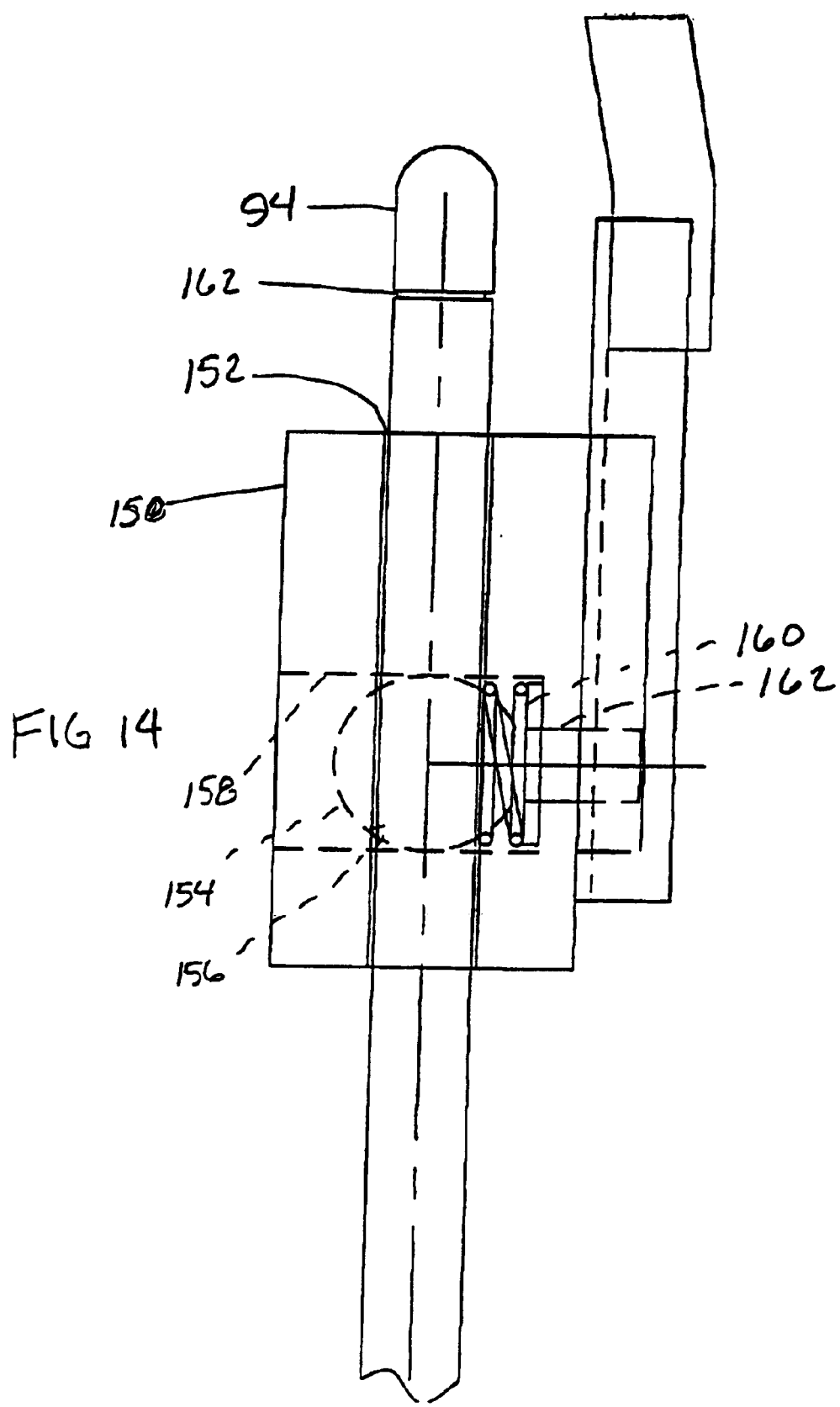

ARTICULATED HEADRESTRAINT SYSTEM

FIELD OF THE INVENTION

The present invention generally relates to an Articulated Head Restraint System that is part of an automobile.

BACKGROUND AND SUMMARY OF THE INVENTION

For a number of years the sole purpose of vehicle headrests was for the comfort of the occupant. The headrest could be adjusted up and down in most cases, and moved fore and aft in some expensive models. A typical headrest consists of a notched rod that may be straight or bent in a "U" shape and held in the car seat's guide tube. Foam and trim covers are placed on top of the rod (the headrest assembly) to give head and neck support and passenger comfort. The notches placed along the length of the rod help in moving the headrest assembly up and down, and locking the headrest in a specific place depending upon the occupant's height.

The headrests that move fore and aft are typically of a riveted design (4-way). The headrest is made in two parts. The upper section has welded brackets and a pair of notched rods. The rods are attached to the upper section with rivets and a friction pack comprising a wave washer, a flat washer and a rubber or plastic washer. The upper section pivots on the pair of rods at riveted joints. The upper section is foamed and trimmed for the headrest. The friction on the riveted joints control the movement of the upper section with respect to the lower notched rods.

The problem with existing designs is that efforts to move the headrest depend upon the dimensional tolerances of seat frame components. While 4-way headrests allow movement in both the up and down directions as well as fore and aft, they depend upon the friction on the rivet to keep in place and for movement. Increasing friction causes higher efforts, while reducing friction allows the upper section to fall since there is no locking mechanism.

With new regulations, headrests are becoming a part of the overall safety restraint system in the vehicles, and are being used as a protection device for whiplash in case of an accident. This requires the headrest to lock in a specific position and not move (at least in the aft direction) unless an activation device is used to move it from one position to another.

The present invention provides a head restraint system that overcomes some of the above-described problems of the related art. The invention allows the occupant to lock the headrest in a specific position. The headrest can be moved forward with minimal effort, while moving the headrest in the opposite direction requires a pushbutton activation. The invention also combines up and down motions and eliminates the effort issues related to seat frame dimensional tolerances.

The following prior art is related to this technology: U.S. Pat. Nos. 4,830,434 issued May 16, 1989 to Keiichi Ishida and Takami Terada for "Adjustable Headrest Device for Vehicle"; 5,669,668 issued Sep. 23, 1997 to Andrew Leuchtmann for "Folding Headrest in Particular for Motor Vehicles" and 6,045,181 issued Apr. 4, 2000 to Noriyuki Ikeda and Moriyuki Eguchi for "Adjustable Headres"

Still further objects and advantages of the invention will become readily apparent to those skilled in the art to which the invention pertains, upon reference to the following drawings.

DESCRIPTION OF THE DRAWINGS

The description refers to the accompanying drawing s in which like reference characters refer to like parts throughout the several views and in which:

FIG. 9 is a view of the pushbutton assembly of FIG. 8;

FIG. 10 is a top view of the assembly of FIG. 9;

FIG. 11 is a sectional view as seen along lines 11—11 of FIG. 9;

FIG. 14 illustrates another embodiment of the invention.

DESCRIPTION OF THE PREFERRED EMBODIMENT

Figure 1:
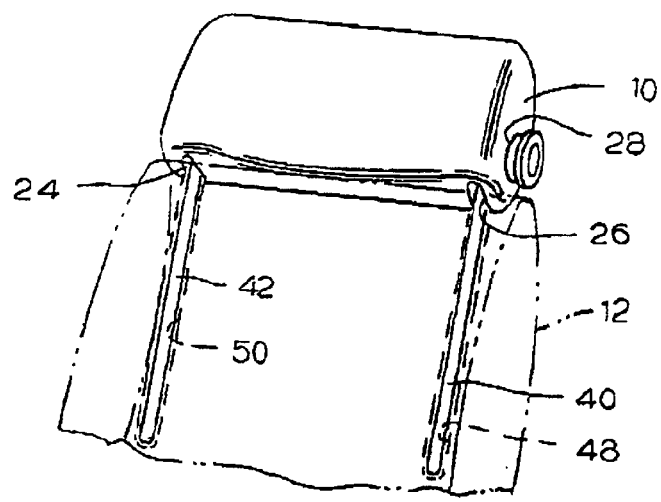
FIG. 1 is a font view of a vertically adjustable seat back illustrating the invention.
Figure 2:
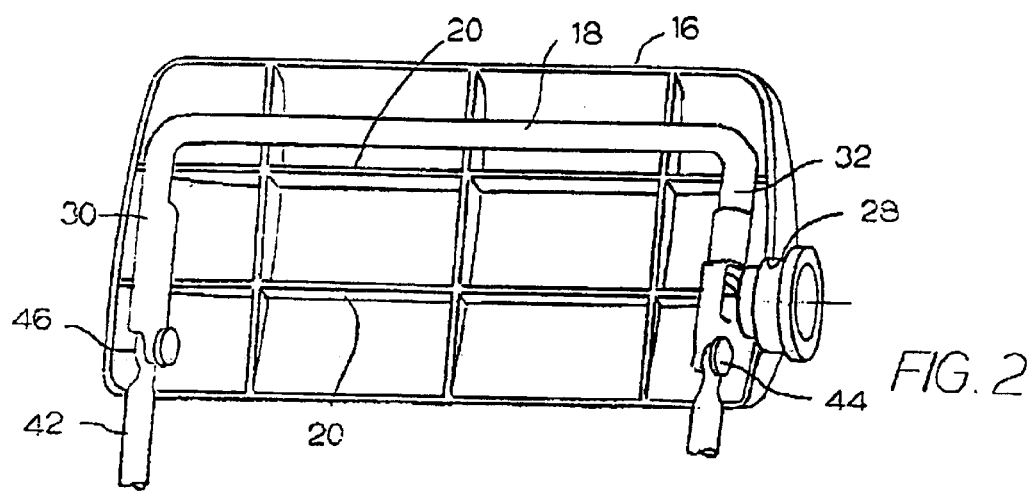
FIG. 2 is a view of the seat back of FIG. 1 with the front cover removed.
Figure 3:
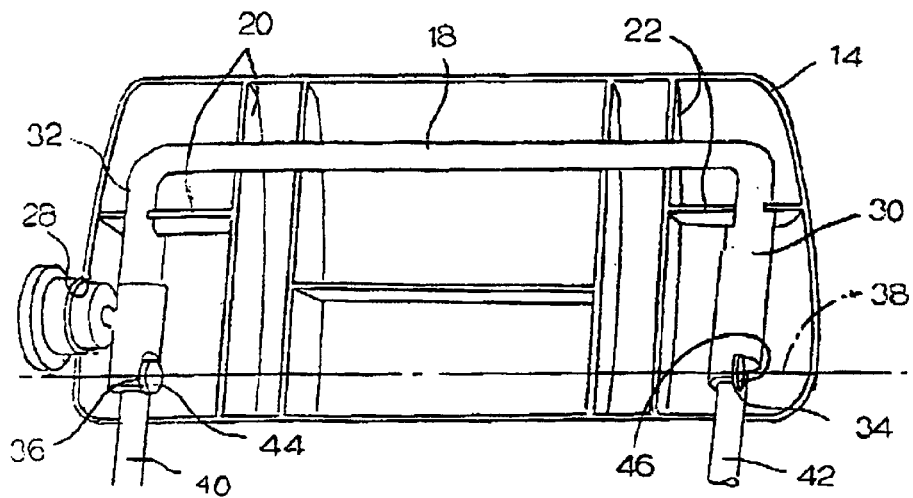
FIG. 3 is a view of the seat back of FIG. 1 with the rear cover removed.

Referring to the drawings, FIG. 1 illustrates an adjustable headrest 10 mounted on a vehicle seat back 12, illustrated in phantom. Referring to FIGS. 2 and 3, headrest 10 includes a back cover 14 fastened to a front cover 16. The two covers have edges formed together to form a hollow headrest housing. A U-shaped tubular upper support member 18 is captured between the front and rear covers in ridge means 20 and 22, respectively. When the two covers are joined together, they combine to form a pair of lower slots 24 and 26. The two covers also combine to form a side button opening 28. Support member 18 is fixed to and moves with the two covers.

Support member 18 has a pair of parallel brackets 30 and 32. The lower ends of the two brackets have rivet-receiving openings 34 and 36, aligned along a pivotal axis 38.

A pair of upright parallel legs 40 and 42 have upper flattened ends connected by rivet means 44 and 46 to the lower ends of brackets 32 and 30, respectively. The headrest pivots about the upper end of legs 40 and 42 about axis 38.

Referring to FIG. 1, legs 40 and 42 are received in sockets 48 and 50 in the seat back, locked against horizontal motion. The upper ends of legs 40 and 42 extend through slots 24 and 26 to permit the headrest to swing forwardly and rearwardly with respect to the seat back.

Referring to FIGS. 4–7, a gear segment 52 is integrally attached to the upper end of leg 40 and has, for illustrative purposes, six teeth 54 spaced in an arc about axis 38. Pawl 56 is slidably mounted on bracket 32. The pawl has a pair of teeth 58 engageable with teeth 54 on the gear segment. The pawl is slidable along the longitudinal axis of bracket 32 between a lower locking position, illustrated in FIGS. 5 and 7, in which teeth 58 engage teeth 54 to lock the headrest against rearward pivotal motion, and an upper release position, illustrated in FIG. 6, in which the pawl is separated from the gear segment teeth to permit the headrest to pivot rearwardly about the seat back. The gear segment teeth are so formed as to permit the pawl to ratchet around the gear segment when the headrest is moved forwardly, but to lock the pawl in engagement with the gear segment against rearward motion unless a pushbutton, to be described, is depressed.

Figure 4:
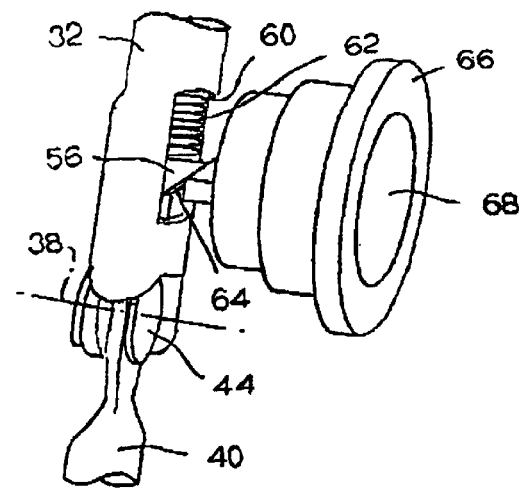
FIG. 4 is a perspective view of the release button assembly.
Figure 5:
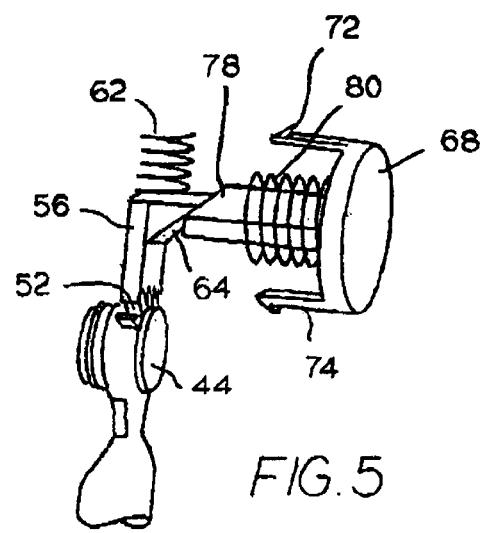
FIG. 5 is another fragmentary view of the release button assembly in its rear position.
Figure 6:
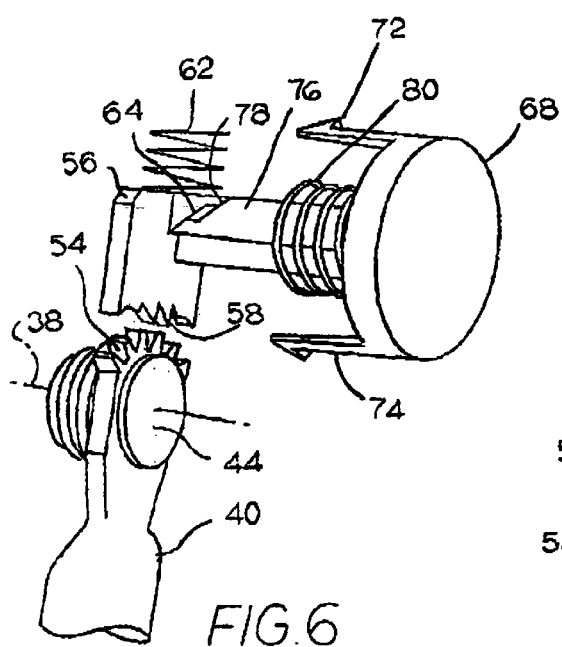
FIG. 6 is a view of the gear assembly in the disengaged position.
Figure 7:
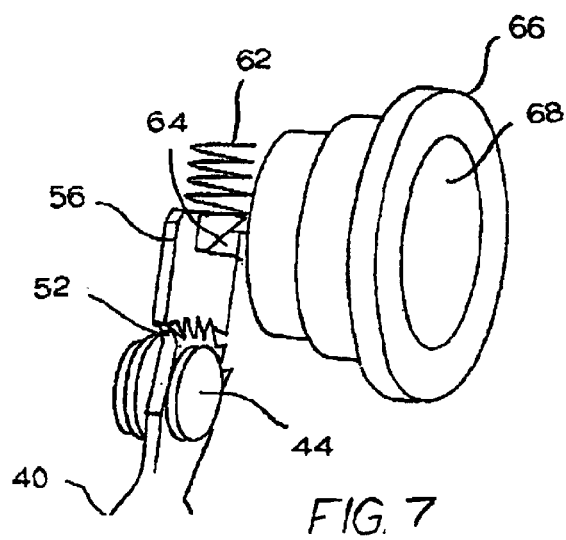
FIG. 7 is the view of the gear assembly with the seat back in the forward position.
Figure 8:
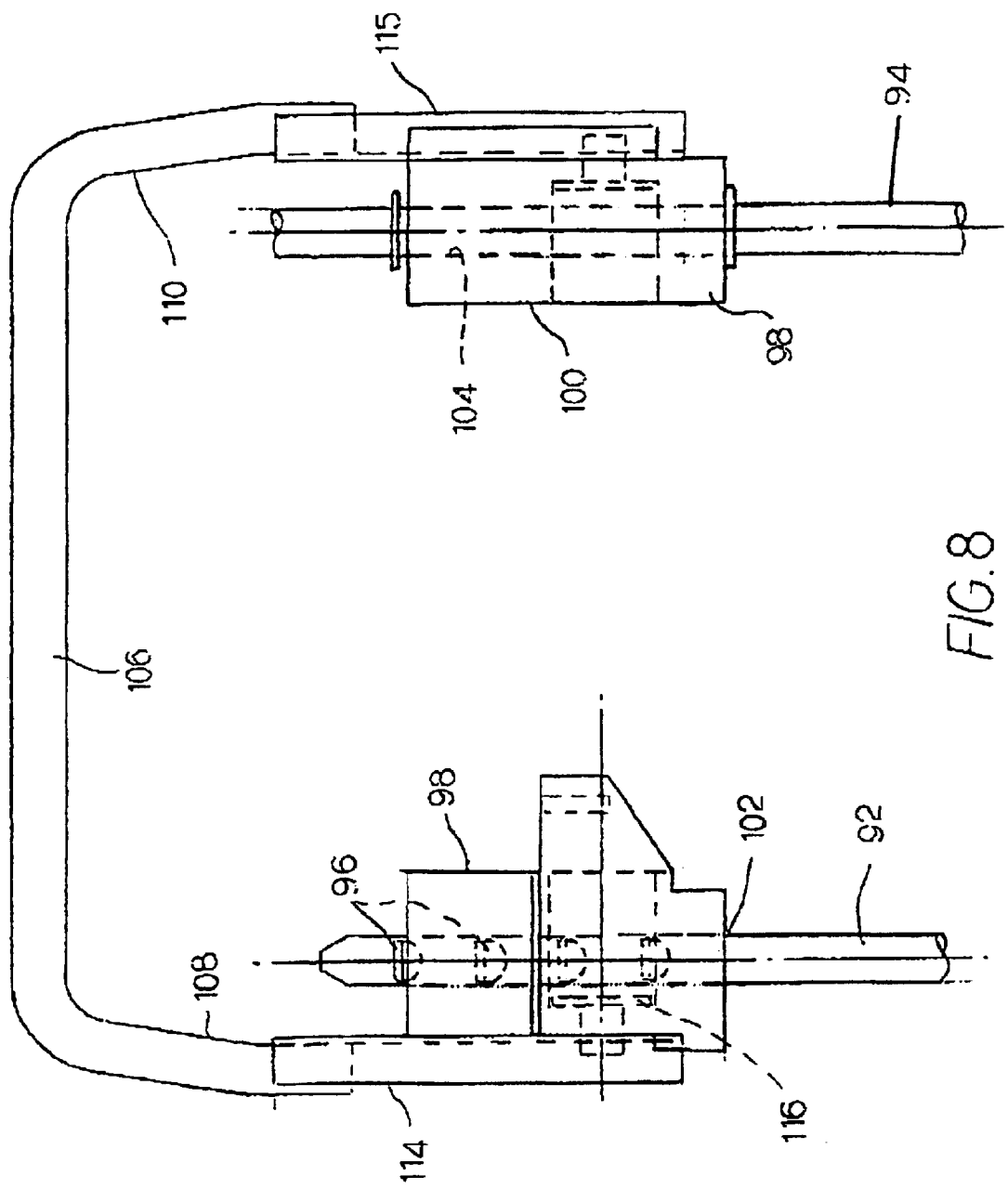
FIG. 8 is a view of another preferred adjustable headrest with the front cover removed.

Referring to FIG. 4, bracket 32 has an internal abutment 60. A helical spring 62, mounted between the upper end of the pawl and abutment 60, biases the pawl towards its locking position with the gear segment.

The pawl has a cam surface 64 facing toward cam button opening 28. A button housing 66 is tighty mounted in button opening 28. Housing 66 is hollow and slidably supports a pushbutton 68 in an internal bore 70, as shown in FIG. 16.

The pushbutton has a pair of prongs 72 and 74 and a central tongue 76. The tongue has a flat cam surface 78 which is slidably engaged with a complementary, flat cam surface 64 in a notch in the pawl. A return spring 80, mounted in the button housing biases the pushbutton toward a locking position in which cam 78 slides on cam 64 so the pawl teeth 58 fully engage teeth 54 on the gear segment. By pushing the pushbutton toward bracket 32, the pushbutton cam 78 will slide towards the pawl, biasing the pawl upwardly away from the gear segment, towards the release position, illustrated in FIG. 6.

In operation, the user readjusts the headrest by either pushing the headrest forwardly, or by pushing the pushbutton to release the pawl from the gear segment to swing the headrest toward a rearward position, and then releases the pushbutton to lock the headrest in its adjusted position.

FIGS. 8–11 show another embodiment of the invention in which headrest 90 is vertically adjustable on a pair of posts 92 and 94 that extend above the top of the vehicle seat back. Outer covers 14 and 16 are removed for clarity. This design allows vertical adjustment of the headrest on posts 92 and 94. This design also allows the headrest to pivot as well as move vertically on posts 92 and 94.

Post 92 has a series of vertically and evenly spaced notches 96. A pair of support blocks 98 and 100 have through holes 102 and 104 slidably mounted on posts 92 and 94 for up and down motion.

A U-shaped support member 106, has a pair of legs 108 and 110 pivotally mounted on support blocks 98 and 100. Pivot brackets 114 and 115 are welded to the lower ends of support legs 108 and 110, respectively. Each bracket is mounted in a slot in its respective support block. The lower end of the two support brackets are pivotally mounted on their respective support blocks by rivets 117a and 117b.

FIGS. 9 and 10 show a button housing 118 mounted on the hollow headrest housing, not shown. A pushbutton 120 is slidably mounted in the button housing so as to be moveable either toward or away from bracket 114. The pushbutton has a frusto-conical cam surface 124, which slidably engages a complementary cam surface 126, carried on pawl 128. Pawl 128, is vertically slidably mounted on bracket 114, and has locking teeth means 130, for engaging teeth 132, of a gear segment 134, FIG. 11. Pushing button 120 separates the pawl from the gear segment to permit the headrest to pivot about rivet 116.

Referring to FIGS. 9 and 10, the pushbutton cam surface 124 engages a vertical adjustment detent 136. When the pushbutton is depressed toward the right as viewed in FIG. 10, the detent pivots counter-clockwise, about pin 137 so that a tooth 137a disengages a vertical adjustment notch 96 on post 92. A leaf spring 138, held in the headrest housing, not shown, keeps constant pressure urging the detent toward post 92 so that when pushbutton 120 is released, the detent can snap into a notch 96 on bar 92.

Figure 12:
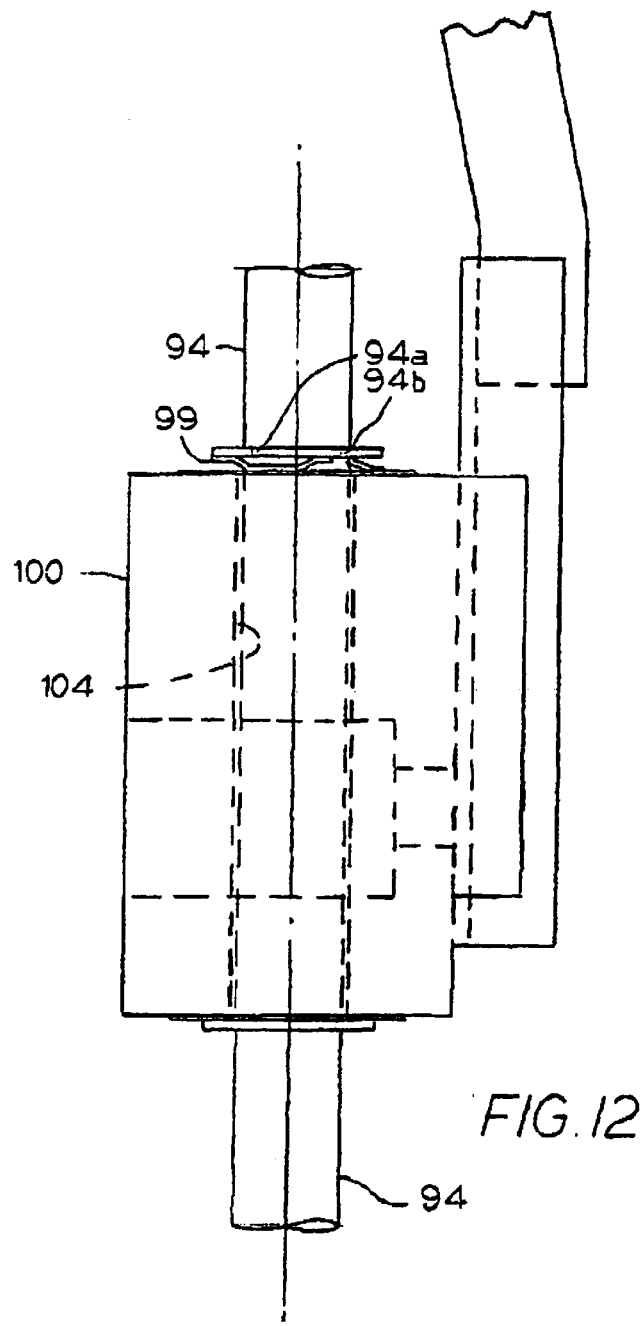
FIG. 12 is a view of the rivet assembly of the embodiment of FIG. 9.
Figure 13:
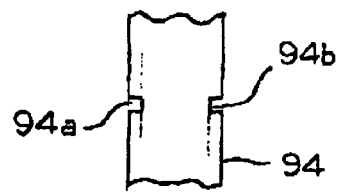
FIG. 13 is a fragmentary view of post 94.

FIGS. 12 and 13 show a view of support block 100, which has lateral movement in hole 104. Post 94, has two grooves 94A and 94B for retention in block 100, along with a spring 99, which maintains a constant pressure on block 100, in the event that there is any centerline variation in the seat back assembly.

FIG. 14 shows another embodiment of the design to accommodate any variation of the centerline in the seatback assembly. Support block 150 has a bore 152 which receives post 94. Bore 152 has a larger diameter than the post so block 150 is laterally movable on the post. Ball 154, has a hole 156 that has a slip fit to post 94. Block 150 has a lateral hole 158 which receives ball 154 so that the post is able to move laterally and angularly in block 150. A spring 160 placed between ball 154, and a rivet 162 in bore hole 158 keeps constant pressure of the ball on post 94. Post 94 has a groove 162 for receiving a locking clip, not shown, to hold post 94 in the headrest.

The safety features of this design are such that the headrest will lock in the set position and will not rotate or pivot back away from the driver's head, or drop lower down into the seat unless the pushbutton is depressed.

Having described our invention, we claim:

1. An adjustable headrest for a vehicle seat comprising:
    a first support mounted on a vehicle seat;
    a second support pivotally mounted with respect to the first support about a pivotal axis toward either a forward direction or a rearward direction;
    a headrest mounted on the second support and movable therewith;
    a gear segment mounted on the first support, the gear segment having a series of teeth formed in an arc about said pivotal axis;
    a pawl having a first cam surface, and a series of teeth, the pawl being mounted on the second support and movable toward said gear segment teeth and a position in which the pawl teeth are meshed with the gear segment teeth, to lock the headrest against movement in the rearward direction;
    a pushbutton actuator including a pushbutton having a second cam surface engageable with the pawl first cam surface for mechanically camming the pawl toward a release position in which the pawl teeth are separated from the gear segment teeth to permit the headrest to be pivoted in either the rearward direction, or the forward direction;
    the pushbutton and the second cam surface being movable in a reverse direction to a position permitting movement of the pawl teeth either toward or away from the gear segment teeth; and
    bias means urging the pawl teeth toward the gear segment teeth whereby when the pawl teeth are engaged with the gear segment teeth, the headrest is locked against rearward pivotal motion from an adjusted position, but may be ratcheted in the forward direction to an adjusted position, and when the pawl teeth are disengaged from the gear segment teeth, the headrest is pivotal about said pivotal axis in either a rearward direction, or a forward direction.

2. An adjustable headrest as defined in claim 1, in which the first support includes a post mounted on a seat back.

3. An adjustable headrest as defined in claim 2, including a body, the gear segment being mounted on the body so as to be movable therewith, the body having an opening for receiving said post for vertical motion thereto, the post having a notch, and including a lever having a tooth mounted for motion between a locking portion in which the lever tooth engages the notch in the post, and a release position in which the lever tooth is separated from the notch to permit movement of the body along the post.

4. An adjustable headrest as defined in claim 3, in which the lever is pivotally mounted on the body.

5. An adjustable headrest as defined in claim 1, including means for supporting the pawl for a sliding motion either toward or away from said gear segment and said pivotal axis.

6. An adjustable headrest as defined in claim 1, in which the pushbutton is movable along a path of motion parallel to said pivotal axis as the pushbutton is urged toward said release position.

7. An adjustable headrest as defined in claim 1, in which the first support comprises a pair of spaced parallel posts, and the second support comprises a U-shaped member having a pair of legs, and means pivotally connecting the pair of legs to the parallel posts for pivotal motion.

8. An adjustable headrest as defined in claim 7, in which the post is vertically adjustable with respect to a vehicle seat back.

9. An adjustable headrest as defined in claim 7, including means for releasably connecting the second support to the first support for an adjustable motion along the length of the parallel posts.

10. An adjustable headrest as defined in claim 7, including a first rivet pivotally connecting one of said pair of legs to one of said pair of posts, and a second rivet pivotally connecting the other of said pair of legs to the other of said pair of posts.

11. A method for mounting an adjustable headrest on a vehicle seat, comprising:

mounting a first support on a vehicle seat;

pivotally mounting a second support with respect to the first support for motion about a pivotal axis toward either a forward direction or a rearward direction;

mounting a headrest on the second support;

mounting a gear segment on the first support, the gear segment having a series of teeth formed in an arc about said pivotal axis;

mounting a pawl having a first cam surface, and a series of teeth engageable with the gear segment teeth, on the second support for movement toward said gear segment teeth and a meshed position in which the headrest is locked against movement in the rearward direction;

mounting a pushbutton having a second cam surface engageable with the pawl first cam surface for mechanically camming the pawl toward a release position in which the pawl teeth are separated from the gear segment teeth to permit the headrest to pivot either in the forward direction or the rearward direction, the pushbutton being movable in a reverse direction permitting movement of the pawl toward the gear segment teeth; and mounting bias means for urging the pawl teeth toward the gear segment whereby when the pawl teeth are engaged with the gear segment teeth, the headrest is locked against rearward pivotal motion, but may be ratcheted forward toward an adjusted position with respect to the seat, and when the pawl teeth are disengaged from the gear segment teeth, the headrest is pivotal about said pivotal axis toward an adjusted position with respect to the seat.

* * * * *